(12) United States Patent
Takeno et al.

(10) Patent No.: US 6,635,360 B2
(45) Date of Patent: Oct. 21, 2003

(54) ALUMINUM ALLOY BRAZING SHEET

(75) Inventors: Shinji Takeno, Tokyo (JP); Nobuyuki Kakimoto, Tokyo (JP)

(73) Assignee: Sky Aluminum Co., Ltd., Tokyo (JP)

(*) Notice: Subject to any disclaimer, the term of this patent is extended or adjusted under 35 U.S.C. 154(b) by 0 days.

(21) Appl. No.: 10/035,774

(22) Filed: Oct. 26, 2001

(65) Prior Publication Data

US 2003/0099856 A1 May 29, 2003

(51) Int. Cl.[7] .............................. B32B 15/20; B23K 31/02
(52) U.S. Cl. ........................ 428/654; 228/214; 228/219; 428/686; 428/924; 428/925
(58) Field of Search ................................ 428/654, 686, 428/924, 925; 228/214, 219

(56) References Cited

U.S. PATENT DOCUMENTS 2,821,014 A    1/1958    Miller
3,891,400 A  * 6/1975    Robinson ..................... 428/654
3,917,151 A   11/1975    Robinson

FOREIGN PATENT DOCUMENTS

| JP | 7-108474 | 2/1994 |
| JP | 2001-47275 | 2/2001 |

* cited by examiner

Primary Examiner—Robert R. Koehler
(74) Attorney, Agent, or Firm—Merchant & Gould, P.C.

(57) ABSTRACT

A brazing sheet comprises a thin covering material and a core material as well as an Al—Si alloy brazing material inserted between the thin covering material and the core material. The brazing material further contains Mg, Bi and/or Zn, Sn, In. When the above brazing material is molten in an inert gas atmosphere, this molten brazing material seeps onto the surface of the above thin covering material, whereby the brazing sheet is fluxlessly brazed to joint materials.

9 Claims, 3 Drawing Sheets

ALUMINUM ALLOY BRAZING SHEET

FIELD OF THE INVENTION

The present invention relates to an aluminum alloy brazing sheet capable of fluxless joint in an inert gas atmosphere, a brazing process using the same, and a brazed product using the same.

BACKGROUND OF THE INVENTION

An aluminum brazing process has been used for manufacturing heat exchangers and panels as it is an efficient method capable of making joints with large areas and joints with multiple points. For these multi-point joints, a brazing sheet clad with a brazing material as a covering material of a core material which in turn serves as a structural material is generally used by virtue of an arrangement efficiency of the brazing material for the joints.

Three brazing methods, namely, (1) a fluxless method in vacuum, (2) a non-corrosive flux method in an inert gas atmosphere, and (3) a corrosive flux method in air, have hitherto been used.

Among these methods, there have been problems because method (1) requires an expensive vacuum furnace, method (2) requires an airtight atmosphere furnace which is cheaper than the vacuum type but relatively expensive, a flux coating process, and an expensive inert gas which is consumed, and method (3) requires a large amount of labor and cost for processing a corrosive flux before and after brazing although it is excellent in apparatus and consumable expense.

In the light of these problems, for example, a method has been proposed in which brazing without flux is carried out in a nitrogen atmosphere using a brazing sheet comprised of an Al—Si—Mg—Bi brazing material, as shown in Welding Journal, Oct. 1983, page 31.

However, this method has been still problematic in that an oxidation film on an original sheet must be controlled to be thin and a flow of nitrogen gas must be increased for prevention of oxidation.

SUMMARY OF THE INVENTION

It is therefore an object of the present invention to provide an aluminum alloy brazing sheet capable of fluxless joint in a simpler inert gas atmosphere, dissolving the problematic issues in the related art as described above.

According to a first aspect of the present invention, there is provided an aluminum alloy brazing sheet which comprises: a thin covering material; a core material; and an Al—Si alloy brazing material as an intermediate material interposed between the thin covering material and the core material, wherein the thin covering material and the core material comprise aluminum alloy shaving a solidus temperature higher than a liquidus temperature of the brazing material so that the molten brazing material seeps onto a surface of the thin covering material when the brazing material is molten in an inert gas atmosphere, thereby allowing fluxless brazing.

This arrangement enables substantial reduction in the production cost, partly because brazing can be carried out without expensive installations such as a vacuum furnace and an airtight atmosphere furnace, and flux, and partly because the least inert gas is consumed. It also renders the braze-assembling work easy because the brazing sheet can be placed in a desired position easily. In addition, the inventive arrangement leads to provision of braze-assembled products that exhibit excellent corrosion resistance.

Desirably, the Al—Si alloy brazing material further contains one or two of from 0.1 to 5% (by mass; the same hereinafter) of Mg and from 0.01 to 0.5% of Bi.

The Al—Si alloy brazing material, may further contain one, two or three of from 0.1 to 5% of Zn, from 0.01 to 0.1% of In, and from 0.01 to 0.1% of Sn.

According to a second aspect of the present invention, there is provided an aluminum alloy brazing sheet brazing process is provided which comprises the steps of: providing an aluminum alloy brazing sheet comprised of a thin covering material, a core material, and an Al—Si alloy brazing material as an intermediate material interposed between the thin covering material and the core material, wherein the thin covering material and the core material comprise aluminum alloys having a solidus temperature higher than a liquidus temperature of the brazing material, and conducting brazing using the brazing sheet but without flux in an inert gas atmosphere.

According to a third aspect of the present invention, there is provided a product which is braze-assembled by an aluminum alloy brazing sheet brazing process which comprises the steps of: providing an aluminum alloy brazing sheet comprised of a thin covering material, a core material, and an Al—Si alloy brazing material as an intermediate material interposed between the thin covering material and the core materials, wherein the thin covering material and the core material comprise aluminum alloy shaving a solidus temperature higher than a liquidus temperature of the brazing material, and conducting brazing using the brazing sheet but without flux in an inert gas atmosphere.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1A:
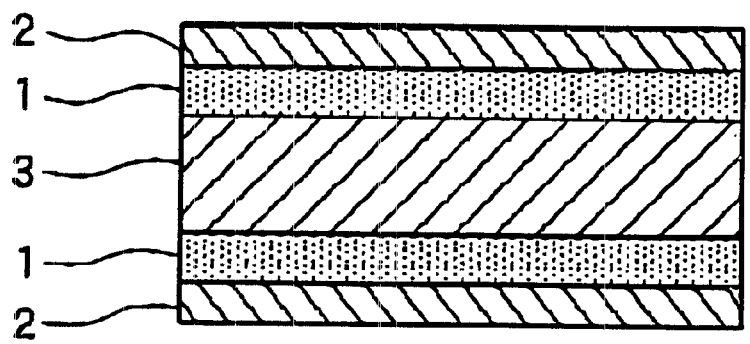
FIGS. 1A to 1C are cross-sectional views showing layer arrangements of aluminum alloy brazing sheets according to the present invention, namely, a layer arrangement clad with the brazing material on both sides, a three-layer arrangement clad with the brazing material on one side, and a four-layer arrangement clad with the brazing material on one side.

The following description is merely exemplary in nature and is in no way intended to limit the invention, its application or uses.

In a preferred embodiment of the present invention, an Al—Si alloy brazing material is used as an intermediate material between a thin covering material and a core material.

Si is an essential alloying element of the aluminum alloy brazing material and has functions by which a melting point of the brazing material is lowered and fluidity of the molten brazing filler is improved. Its amount to be added is from 5.0 to 15.0%. When it is less than 5.0%, lowering of the melting point is insufficient and thus fluidity of the molten brazing filler is not good. When it is more than 15.0%, Si primary crystal is generated, and the molten penetrating amount into the core material is increased as the accumulation of the molten brazing filler to a fillet portion is decreased.

It is acceptable that approximately 0.5% or less of Fe which is an unavoidable impurity commonly contained in aluminum is comprised since it does not harmfully affect the properties of the brazing material.

It is desirable that the Al—Si alloy brazing material further contains one or two of from 0.1 to 5% of Mg and from 0.01 to 0.5% of Bi.

Mg facilitates wet-spreading of the brazing filler in an inert gas atmosphere. In particular, this function caused by the addition of Mg is effective when concentration of oxygen is high in the inert gas atmosphere. The amount of Mg to be added is from 0.1 to 5%. When Mg is less than 0.1%, there is no facilitating effect on wet-spreading of the brazing filler, and when more than 5%, the facilitating effect is saturated with no economic advantage.

In vacuum brazing, Mg mostly evaporates and makes little contribution to the improvement in strength after brazing. In brazing in an inert gas atmosphere, Mg remains in great amount and thus contributes to the improvement in strength after brazing.

Bi coexistent with Mg or a lone facilitates wet-spreading of the brazing filler in the inert gas atmosphere. The amount of Bi to be added is from 0.01 to 0.5%. When Bi is less than 0.01%, there is no facilitating effect on wet-spreading of the brazing filler, and when more than 0.5%, the facilitating effect is saturated with no economic advantage.

One, two or three of from 0.1 to 5% of Zn, from 0.01 to 0.1% of In, and from 0.01 to 0.1% of Sn are further contained in the brazing material.

These elements make the brazing material have sacrificial anti-corrosion and improve corrosion resistance of the core material. The amount of these elements to be added is from 0.1 to 5% for Zn and from 0.01 to 0.1% for, In and Sn, respectively.

When each is less than its lower limit, sacrificial anti-corrosion is insufficient, and when more than its upper limit, sacrificial anti-corrosion is saturated with no economic advantage.

The aluminum alloys having a solidus temperature higher than a liquidus temperature of the brazing material are used for the thin covering material and the core material.

Any composition of aluminum alloys may be used so long as the above requirement is satisfied, and the aluminum alloys can be used by selecting standardized alloys, such as JIS A 1070, 1050, 1100, 1200, 3003, 3203, 3004, 5005, 5N01, 6951, 6061, 6063, 6N01 and the like, or these alloys to which various alloy elements are further added, in consideration of product strength, corrosion resistance and so on as required.

In a brazing process using flux, Mg contents in joint materials (base materials) and core materials are strictly controlled because Mg reacts with the flux. In the present invention, such strict Mg content control is not necessary with respect to the joint and core materials because no flux is use. This makes it possible to use alloys which remain strong after brazing.

It is desirable that the thin cover material contains no Mg because, if it contains Mg, in the course of heating for brazing, an oxidation film or layer is likely to grow on a surface of the thin covering material.

Brazing sheets having a thickness of 0.05 to 2.0 mm are employed herein. When the sheet thickness is less than 0.05 mm, it is difficult to manufacture and brazing efficiency is reduced due to brazing material shortage. When the thickness is more than 2.0 mm, it is unnecessarily thick and is not economical.

Brazing sheets having a thickness of 0.05 to 0.2 mm are used as fin materials. Brazing sheets having a thickness of 1.0 to 1.6 mm are suitable for use as tank materials for radiators. Brazing sheets having a thickness falling between those thicknesses are suitably used as plate materials for evaporators.

The clad ratio of the thin covering material (ratio of the thickness of one layer of the thin covering material to the entire sheet thickness) is from 0.1 to 10%, and the clad ratio of the intermediate brazing material (ratio of the thickness of one layer of the intermediate brazing material to the entire sheet thickness) is from 5 to 20%.

Their reasons are as follows.

When the clad ratio of the thin covering material is less than 0. 1%, it is problematic in that control management of the thickness is difficult and the covering material is peeled off during a rolling process, and when more than 10%, seeping can hardly occur when the brazing filler melts.

When the clad ratio of the intermediate brazing material is less than 5%, brazing efficiency is reduced due to shortage of the brazing material, and when more than 20%, molten erosion of the core material occurs due to excessive brazing-filler and it is undesirable.

Figure 1B:
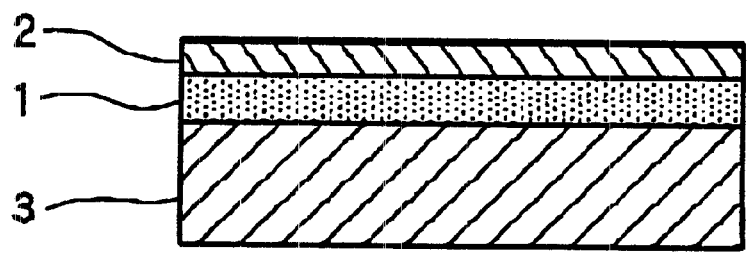
Figure 1C:
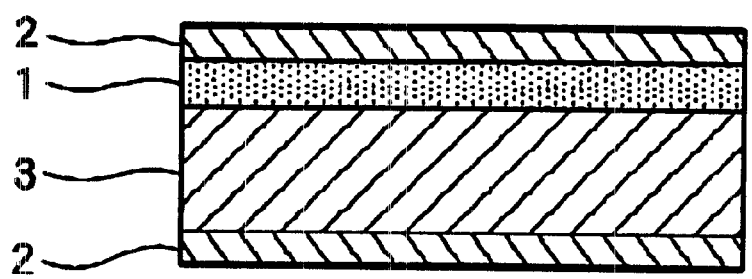

Typical example arrangements of the thin covering material, intermediate brazing material, and core material are illustrated FIGS. 1A, 1B and 1C.

The thin covering material 2 and the intermediate brazing material 1 may be laid on both sides of or one side of the core material 3. In this instance, the thin covering material 2 and the intermediate brazing material 1 may be disposed in a set. When both sides-are clad with the brazing materials, five layers including the core material are given as shown in FIG. 1A. When one side is clad with the brazing material, three layers including the core material are given as shown in FIG. 1B.

Further, a sacrificial anodic layer may be set on the other side in addition to one side clad with the brazing material to improve corrosion resistance. In this case, the four-layer structure is given as shown in FIG. 1C.

Oxygen concentration in the inert gas atmosphere may be set at 1000 ppm or less.

The lower concentration of oxygen is more preferable in terms of brazing efficiency, but the cost is increased since a large quantity of inert gas is required for attaining 30 ppm or less of oxygen concentration.

As described above, when the Al—Si alloy brazing material further contains one or two of from 0.1 to 5% of Mg and from 0.01 to 0.5% of Bi, brazing is possible at up to about 1000 ppm of oxygen concentration, whereas it does not contain one or two of from 0.1 to 5% of Mg and from 0.01 to 0.5 % of Bi, brazing is possible only at up to 500 ppm of oxygen concentration.

Nitrogen is usually preferable as the inert gas in terms of cost, but noble gas such as Ar or the like may be used.

The heating temperature for aluminum sheet brazing should be one at which the brazing material melts but the covering material alone does not, namely, a temperature higher than a liquidus temperature of the brazing material but lower than a solidus temperature of the this covering material, normally in a range of 560 to 620° C.

The reasons why fluxless brazing is possible under the inert gas atmosphere in the brazing process according to the invention are assumed to be as follows.

Generally, for enabling aluminum brazing, it is an essential requirement to generate wetting of the molten brazing filler. To satisfy this requirement, the functions of anti-oxidation and oxidation film breaking are needed in the brazing material and a joint companion (base material) during heating for brazing. In this case, it is believed necessary that sensitivity of the both functions is higher especially in the brazing material and that control is stricter on the brazing material than on the joint companion (base material)

Thus, of the currently available brazing methods as described above, Mg evaporation phenomenon in conjugation with heating in vacuum is utilized (vacuum brazing) or flux in anon-oxidative atmosphere is utilized (non-corrosive flux brazing method in a non-oxidative atmosphere) for these anti-oxidation and oxidation film breaking.

Figure 2A:
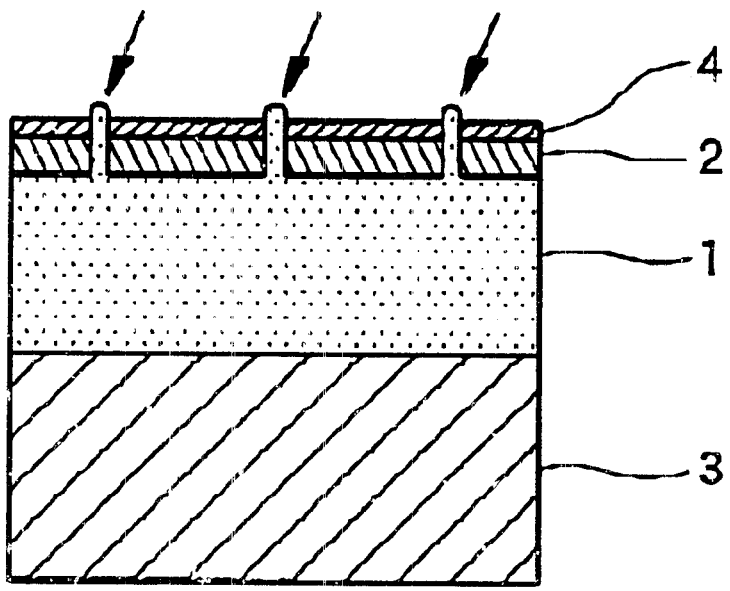
FIGS. 2A and 2B are schematic side views showing mechanisms or manner of seeping of the brazing material and wet-spreading of molten brazing filler.

On the contrary, in the present invention, as shown in FIG. 2A, the brazing material 1 in the intermediate layer is molten as the temperature is elevated during the brazing, but oxidation of the surface of the brazing material does not occur because the surface is covered with the thin covering material 2 which remains solid.

When the temperature is further elevated, the portions with lower melting points, such as the segregation portion of the thin covering material 2 close to the molten brazing material 1, are locally molten, and then the brazing material 1 seeps and spreads over the surface of the thin covering material due to volumetric expansion as shown by arrows. In this case, the surface of the brazing material becomes an emerging face without an oxidation film, and new intensive oxidation does not proceed due to the inert gas atmosphere.

The conventional flux used for the brazing in a air or an inert gas atmosphere and Mg for the vacuum brazing are originally used to facilitate wet-spreading of the molten brazing material by breaking the thick oxidation film which has been generated on the sheet surface or is generated during heating for the brazing. However, because no thick oxidation film exists in the invention, the molten brazing material wettingly spreads even in the absence of flux and Mg.

Figure 2B:
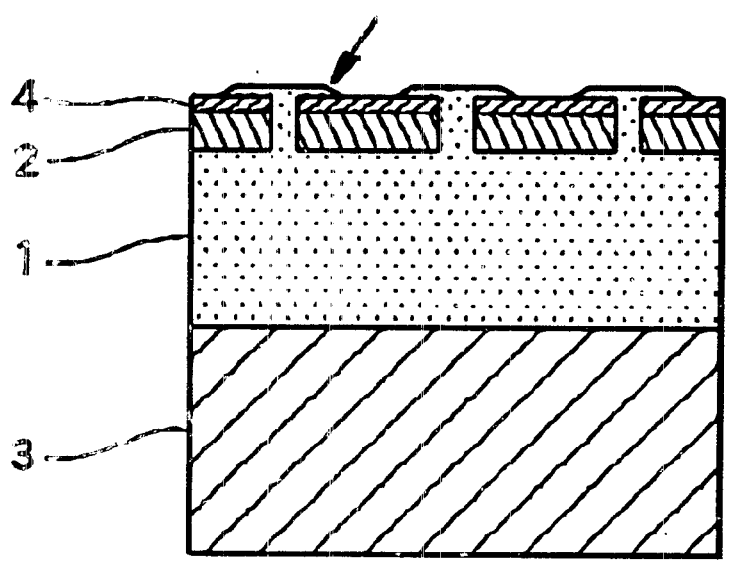

When the temperature is further elevated, as shown in FIG. 2B, melting further proceeds such that many portions of the thin covering material 2 are molten, causing seeping to grow in magnitude. The seeped molten brazing material 1 continuously wet-spreads over the upper surface of the thin covering material. At this time, the thin covering material 2 below the oxidation film also melts in substantial quantity in such a manner as to lose its thickness due to all-out erosion by the molten brazing material. Owing to the molten brazing material spread over the upper surface of the oxidation film on the surface of the thin covering material and the molten thin covering material advanced from below the oxidation film, the oxidation film 4 originally present on the surface of the thin covering material 2 is dispersed in a harmonious mixture of the molten brazing material and the molten thin covering material, resulting in no adverse effect of the oxidation film.

If appropriate amounts of Mg and Bi present in the brazing material, they consume oxygen in a proximal atmosphere and prevent oxidation of the surface of the molten brazing material and the thin covering material. Therefore, wet-spreading of the brazing is facilitated and a good brazing property is maintained even at a little higher concentration of oxygen in the inert gas atmosphere.

DESCRIPTION OF EXPERIMENTS

The core material was made by scalping of both sides to 40 mm in thickness of the book mold casting ingot of the alloy for core material (No. A) shown in the following Table 1, followed by homogenizing treatment at 600° C. for 10 hours.

The thin covering material 1.9 mm thick (clad ratio:3%) and the intermediate brazing material 9.4 mm thick (clad ratio: 15%) were made by scalping of both sides to 40 mm in thickness of book mold casting ingots of alloys for thin covering material (No. B) and for intermediate brazing material (No. from C to M), respectively, and then by hot rolling and cold rolling sequentially.

Then, the thin covering material, intermediate brazing material, and core material were put on by the combination shown in Table 2, were hot-rolled at 500° C. of a starting temperature to be a clad material 4 mm thick, and then this was cold-rolled to 0.5 mm in thickness followed by annealing at 400° C. for 2 hours to make 0 tempered material.

Figure 3:
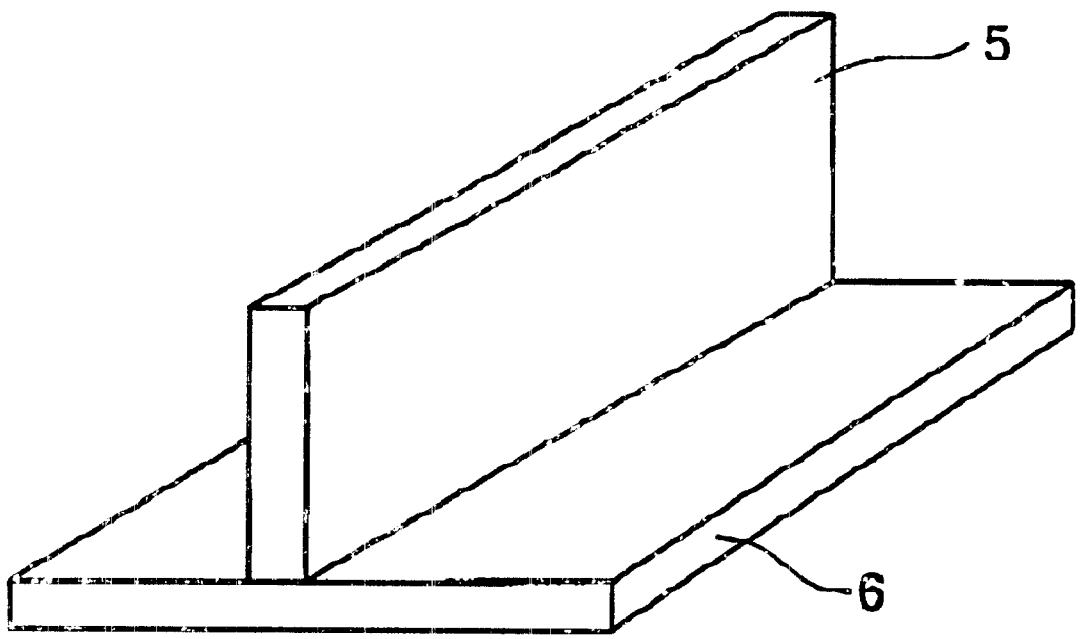
FIG. 3 is a schematic perspective view showing a T-shaped joint piece used for brazeability test.

As shown in FIG. 3, a T-type joint test piece was assembled by combining the brazing sheet 5 with five or three layers (0.5 mm in thickness×30 mm×60 mm) made in this way with JIS A 3003 joint partner material (base material) sheet 6 (1.0 mm in thickness×30 mm×60 mm).

TABLE 1

| No. | Si | Fe | Mn | Mg | Bi | Zn | Sn | In | Al | Solidus Temp. | Liquidus Temp. |
|---|---|---|---|---|---|---|---|---|---|---|---|
| A | — | 0.3– | 1.1 | — | — | — | — | — | Balance | 643 | 654 |
| B | 0.1 | 0.2 | — | — | — | — | — | — | Balance | 647 | 658 |
| C | 10.0 | 0.2 | — | — | — | — | — | — | Balance | 577 | 590 |
| D | 10.0 | 0.2 | — | 1.5 | — | — | — | — | Balance | 559 | 591 |
| E | 10.. | 0.2 | — | — | 0.2 | — | — | — | Balance | 577 | 590 |
| F | 10.0 | 0.2 | — | 1.5 | 0.1 | — | — | — | Balance | 559 | 591 |
| G | 10.0 | 0.2 | — | — | — | 1.0 | — | — | Balance | 576 | 588 |
| H | 10.0 | 0.2 | — | — | — | — | 0.08 | — | Balance | 577 | 590 |
| I | 10.0 | 0.2 | — | — | — | 0.2 | — | 0.08 | Balance | 577 | 590 |
| J | 10.0 | 0.2 | — | 1.5 | — | 1.0 | — | — | Balance | 556 | 577 |
| K | 10.0 | 0.2 | — | 1.5 | — | 2.0 | — | — | Balance | 554 | 575 |
| L | 12.0 | 0.2 | — | 1.5 | — | — | — | 0.05 | Balance | 577 | 580 |
| M | 10.0 | 0.2 | — | 1.5 | — | 0.5 | 0.03 | — | Balance | 558 | 590 |

TABLE 2

| | No. | Thin covering material | Brazing material | Core material | Brazing material | Thin covering material |
|---|---|---|---|---|---|---|
| Invention Examples | 1 | B | C | A | C | B |
| | 2 | B | D | A | D | B |
| | 3 | B | E | A | E | B |
| | 4 | B | F | A | F | B |
| | 5 | B | G | A | G | B |
| | 6 | B | H | A | H | B |
| | 7 | B | I | A | I | B |

TABLE 2-continued

|  | No. | Thin covering material | Brazing material | Core material | Brazing material | Thin covering material |
|---|---|---|---|---|---|---|
|  | 8 | B | J | A | J | B |
|  | 9 | B | K | A | K | B |
|  | 10 | B | L | A | L | B |
|  | 11 | B | M | A | M | B |
| Comparative | 12 | — | C | A | C | — |
| Examples | 13 | — | D | A | D | — |

This test piece was brazed in a furnace (temperature at 600° C.) under a nitrogen atmosphere with various concentrations of oxygen, and taken out from the furnace 5 min after the maximum temperature was reached.

For comparison, the test piece was made as in the above case except that, instead of the covering material of the invention, two kinds of conventional double-side clad brazing sheets were used for the surface of the brazing material, and it was brazed without flux coating as in the case of the invention.

The results of brazing efficiency were evaluated by formation ratios of fillets, i.e., a ratio of the length of fillet formation to the length of brazing joint (the entire length of fillet formation: 100%), and are shown in Table 3 below

TABLE 3

| | Fillet formation ratio (%) | | | | |
|---|---|---|---|---|---|
| No. | Oxygen level 50 ppm | Oxygen level 100 ppm | Oxygen level 500 ppm | Oxygen level 800 ppm | Oxygen level 1200 ppm |
| Invention Examples | | | | | |
| 1 | 100 | 100 | 100 | 10 | 0 |
| 2 | 100 | 100 | 100 | 100 | 20 |
| 3 | 100 | 100 | 100 | 100 | 15 |
| 4 | 100 | 100 | 100 | 100 | 80 |
| 5 | 100 | 100 | 100 | 15 | 0 |
| 6 | 100 | 100 | 100 | 10 | 0 |
| 7 | 100 | 100 | 100 | 10 | 0 |
| 8 | 100 | 100 | 100 | 100 | 30 |
| 9 | 100 | 100 | 100 | 100 | 45 |
| 10 | 100 | 100 | 100 | 100 | 50 |
| 11 | 100 | 100 | 100 | 100 | 40 |
| Comparative Examples | | | | | |
| 12 | 0 | 0 | 0 | 0 | 0 |
| 13 | 60 | 40 | 0 | 0 | 0 |

From the results of Table3, the ratios of fillet formation in Comparative Examples 12 and 13 without surface thin covering materials are low, and particularly no fillet is formed in Comparative Example 12 in which Mg was not contained in the brazing material. Among Examples, in Examples 1, 5, 6 and 7 wherein the brazing material was neither Mg nor Bi, it was confirmed that good joint was exhibited by all 100% of fillet formation ratios when the oxygen concentration is within 500 ppm in the brazing furnace under nitrogen atmosphere, whereas the fillet formation ratios are reduced when the oxygen concentration is above 500 ppm. On the other hand, among the invention Examples, in Example 2, 3, 4, 8, 9, 10, and 11 wherein the brazing material contained either Mg or Bi at an appropriate amount, good joint is exhibited by 100% of fillet formation ratios even when the oxygen concentration is above 500 ppm in the brazing furnace under nitrogen atmosphere.

For evaluation of the corrosion resistance, one month CASS test according to JIS H 8681 was carried out using a single sheet after heating to braze at 50 ppm of oxygen concentration as an external corrosion resistant evaluation using the brazing sheets (0.5 mmt×70 mm×150 mm) with five layers or three layers. This is the test to evaluate sacrificial anti-corrosion effect for the core material.

After completion of the test, corrosion products were removed and the depth of pitting corrosion was determined by a focal depth method. The results are shown in Table 4 below.

TABLE 4

| | Results of CASS tests | |
|---|---|---|
| No. | Maximum depth of pitting corrosion (mm) | Average depth of pitting corrosion (mm) |
| Invention Examples | | |
| 1 | 0.26 | 0.22 |
| 2 | 0.32 | 0.26 |
| 3 | 0.30 | 0.25 |
| 4 | 0.32 | 0.26 |
| 5 | 0.13 | 0.10 |
| 6 | 0.12 | 0.10 |
| 7 | 0.10 | 0.08 |
| 8 | 0.18 | 0.14 |
| 9 | 0.13 | 0.11 |
| 10 | 0.14 | 0.12 |
| 11 | 0.13 | 0.11 |
| Comparative Examples | | |
| 12 | — | — |
| 13 | 0.38 | 0.29 |

From the results of Table 4, among the brazing sheets of the invention, it was confirmed that a sacrificial anti-corrosion effect worked and the depths of pitting corrosion was shallow since Zn, Sn, In were contained especially in Example 5, 6, 7, 8, 9, 10, and 11 which corresponds to claim 3.

In the Examples corresponding to claim 3, as the content of Zn, Sn, and In are increased, the depth of pitting corrosion is prone to be shallower provided that the content of Si and Mg is constant in the brazing material.

The present disclosure relates to the subject matters of Japanese Patent Application No. 200C-125114, filed Apr. 26, 2000, and Japanese Patent Application No. 2001-324321, filed Oct. 23, 2001, the disclosures of which are incorporated herein by reference in their entireties.

What is claimed is:

1. An aluminum alloy brazing sheet for use in fluxless brazing in an inert gas atmosphere, said aluminum alloy brazing sheet comprising:
   a thin covering material layer;
   a core material layer; and
   an Al—Si alloy brazing material layer interposed between said thin covering material layer and said core material layer, said thin covering material layer and said core material layer being comprised of aluminum alloys having a solidus temperature higher than a liquidus temperature of said Al—Si alloy brazing material layer, herein said Al—Si alloy brazing material layer, when subjected to a fluxless brazing process carried out in an inert gas atmosphere at a temperature between said liquidus temperature and said solidus temperature, is capable of melting while said thin covering material layer remains solid to prevent oxidation of the brazing material being melted down, and then, due to volumetric expansion, seeping through segregation portions of said thin covering material layer onto a surface of said thin covering material layer and spreading over the surface of said thin covering material layer to form an emerging surface free from oxidation film, thereby allowing the fluxless brazing with a joint partner material sheet.

2. An aluminum alloy brazing sheet according to claim 1, wherein said Al—Si alloy brazing material layer further contains one or two from 0.1 to 5% by mass of Mg, and from 0.01 to 0.5% by mass of Bi.

3. An aluminum alloy brazing sheet according to claim 1, wherein the Al—Si alloy brazing material layer further contains one, two, or three of from 0.1 to 5% by mass of Zn, from 0.01 to 0.1% by mass of In, and from 0.01 to 0.1% by mass of Sn.

4. An aluminum alloy brazing sheet according to claim 2, wherein the Al—Si alloy brazing material layer further contains one, two, or three of from 0.1 to 5% by mass of Zn, from 0.01 to 0.1% by mass of In, and from 0.01 to 0.1% by mass of Sn.

5. An aluminum alloy brazing sheet according to claim 1, wherein said thin covering material layer has a thickness which is 0.1 to 10% of the entire thickness of said aluminum alloy brazing sheet, and said Al—Si alloy brazing material layer has a thickness which is 5 to 20% of the entire thickness of said aluminum alloy brazing sheet.

6. A fluxless brazing process using an aluminum alloy brazing sheet in an inert gas atmosphere, comprising the steps of:

providing an aluminum alloy brazing sheet comprised of thin covering material layer, a core material layer, and an Al—Si alloy brazing material layer interposed between said thin covering material layer and said core material layer, said thin covering material layer and said core material layer comprising aluminum alloy having a solidus temperature higher than a liquidus temperature of said Al—Si alloy brazing material layer; and joining said aluminum alloy brazing sheet with a joint partner material sheet by heating said aluminum alloy brazing sheet in the inert gas atmosphere a temperature between said liquidus temperature and said solidus temperature to cause said Al—Si alloy brazing material layer to melt down while keeping said thin covering material layer solid to prevent oxidation of the brazing material being melted, and then cause the Al—Si alloy brazing material to, due to volumetric expansion, seep through segregation portions of said thin covering material layer onto a surface of said thin covering material layer and spread over the surface of said thin covering material layer to form an emerging surface free from oxidation film.

7. A fluxless brazing process according to claim 6, wherein the inert gas atmosphere has an oxygen concentration of 500 ppm.

8. A fluxless brazing process according to claim 6, wherein said Al—Si alloy brazing material layer further contains one or two of from 0.1 to 5% by mass of Mg, and from 0.01 to 0.5% by mass of Bi, and the inert gas atmosphere has an oxygen concentration of 800 ppm.

9. A product braze-assembled by a fluxless brazing process using an aluminum alloy brazing sheet in an inert gas atmosphere, the process comprising the steps of:

providing an aluminum alloy brazing sheet comprised of a thin covering material layer, a core material layer, and an Al—Si alloy brazing material layer interposed between said thin covering material layer and said core material layer, said thin covering material layer and said core material layer comprising aluminum alloys having a solidus temperature higher than a liquidus temperature of said Al—Si alloy brazing material layer; and joining said aluminum alloy brazing sheet with a joint partner material sheet by heating said aluminum alloy brazing sheet in the inert gas atmosphere at a temperature between said liquidus temperature and said solidus temperature to cause said Al—Si alloy brazing material layer to melt down while keeping said thin covering material layer solid to prevent oxidation of the brazing material being melted, and then cause the brazing material to, due to volumetric expansion, seep through segregation portions of said thin covering material layer onto a surface of said thin covering material layer and spread over the surface of said thin covering material layer to form an emerging surface free from oxidation film.

* * * * *